United States Patent

[11] 3,596,065

| [72] | Inventor | Nicholas Lazarchick, Jr., Rockville; Alexander H. Frey, Jr., Gaithersburg and Eugene N. Schroeder, Bethesda, all of, Maryland. |
|---|---|---|
| [21] | Appl. No. | 774,145 |
| [22] | Filed | Nov. 7, 1968 |
| [45] | Patented | July 27, 1971 |
| [73] | Assignees | International Business Machines Corporation, Armonk, N.Y. |

[54] APPARATUS AND METHOD FOR RATE DETECTION
5 Claims, 1 Drawing Fig.

[52] U.S. Cl. .................................................. 235/92 SH,
235/92 MC, 235/92 CC, 235/150.3
[51] Int. Cl. ................................................ H03k 23/02
[50] Field of Search .......................................... 235/92, 96, 68, 59, 150.13, 151.13

[56] References Cited
UNITED STATES PATENTS

| 3,329,806 | 7/1967 | McCauley | 235/92 |
| 3,280,309 | 10/1966 | Villwock | 235/92 |
| 3,327,100 | 6/1967 | Slavin | 235/150.53 |

*Primary Examiner*—Maynard R. Wilbur
*Assistant Examiner*—Robert F. Gnuse
*Attorneys*—Hanifin and Clark and Edward M. Suden

ABSTRACT: A method and apparatus for rate detection of the ratio of first events to second events in a stream of basic events where each event in the stream of basic events must either be a first event or second event. The method provides an indication of the average of the quantized log to the base two of the number of first events that occurs between the occurrence of second events. The apparatus comprises a binary counter, a shift register, a digital to analog converter alarm and metering logic.

APPARATUS AND METHOD FOR RATE DETECTION

BACKGROUND OF THE INVENTION

1. Field of the Invention

The field of the invention relates to an method and apparatus for rate detection for measuring the ratio of the occurrences of first events to second events. More specifically, the invention relates to subject matter for determining the average of the logarithm to the base two of the number of first events that occur in adjacent periods of time, when the periods of time are defined by the occurrence of second events.

2. Prior Art

The prior art methods and apparatus for rate detection generally fall into two categories. The first category of rate detectors employ a method for determining the first or second event rate by counting the number of occurrences of the first or second events per unit time. In order to obtain some meaning from the counted number of first or second events for a given unit time, the unit of time dictates the number of basic events that occurred during that period of time. The major disadvantage of the first category of rate detectors is that they require different calibration for each basic event rate and are prone to error where the basic event rate may randomly vary.

The second category of rate detectors employs the method of counting first or second events per fixed number of basic events. The major disadvantage to the second category of rate detector is that the length of time necessary to determine the first or second event rate is a function of the basic event rate. For low basic event rates and high ratios between first or second events to basic events, the second category of rate detectors may take an interrogation time of several minutes. For example, if the basic event rate was 300 events per second and the sampling period was 100,000 basic events, it would take approximately 6 minutes to determine the first or second event to basic event rate.

Further, where it is required that a single-rate detector be capable of measuring rates of second events to first events between the ratios of 1/10 to 1/100,000, the rate detectors and the methods embodied therein of the prior art become ineffective and expensive. It is therefore the object of the invention to provide a new method for obtaining the average of the quantized log to the base two of the number of first events that occur in varying periods dictated by the occurrence of second events.

It is therefore another object of the invention to provide a new rate detector that is independent of the basic event rate.

A further object of the invention is to provide a new rate detector that is capable of indicating a wide range of event rates.

It is still a further object of the invention to provide a new rate detector which is simple in structure and capable of setting an alarm when the event rate becomes excessive when compared to some dictated value.

SUMMARY OF THE INVENTION

In its broadest sense, the invention is an apparatus and method for obtaining the ratio of second events to first events of a stream of basic events where each event in the steam of basic events is categorized as a first event or a second event. The apparatus is basically a modified digital integrator and peak holding circuit with an analog readout. The apparatus comprises a binary counter, a shift register, a resistor summing network, meter circuitry and alarm circuitry. The rate detector embodies the basic method of counting the number of first events between second events to provide an indication of the ratio of second events to first events. In a broader sense, the rate detector provides the ratio of second events to basic events.

The method employed causes each basic events deemed a first event to add one to a binary counter which in turn causes a shift register to follow the count in the binary counter in a quantized log fashion. Each basic event deemed a second event causes the binary counter to be reset and the shift register to be shifted one position to the low-order position. The number of stages that is turned on in the shift register at any given time is equal to the average of one plus the quantized log to the base two of the number of first events that occur between adjacent second events. The quantized log is constrained to whole numbers. The output of the shift register can be monitored and calibrated to indicate the ratio of second events to first events or second events to basic events.

The rate detector has two modes of operation, an "On Line" mode and a "Calibrate" mode.

The advantages of this method and apparatus for rate detection is that the rate indication is not dependent upon a fixed sampling interval which severely limited the accuracy and versatility of prior art rate detectors.

Another advantage of the rate detector and the method embodied therein is its capability to indicate a wild range of event rates.

Another advantage of the rate detector is its fast response for indicating rapidly lowering event rates.

BRIEF DESCRIPTION OF THE DRAWINGS

The foregoing and other objects, features and advantages of the invention will be apparent from the following more particular description of the preferred embodiment of the invention as illustrated in the accompanying drawing which shows a logic diagram of the rate detector of the preferred embodiment of the invention.

DESCRIPTION OF THE PREFERRED EMBODIMENT

Figure 1:
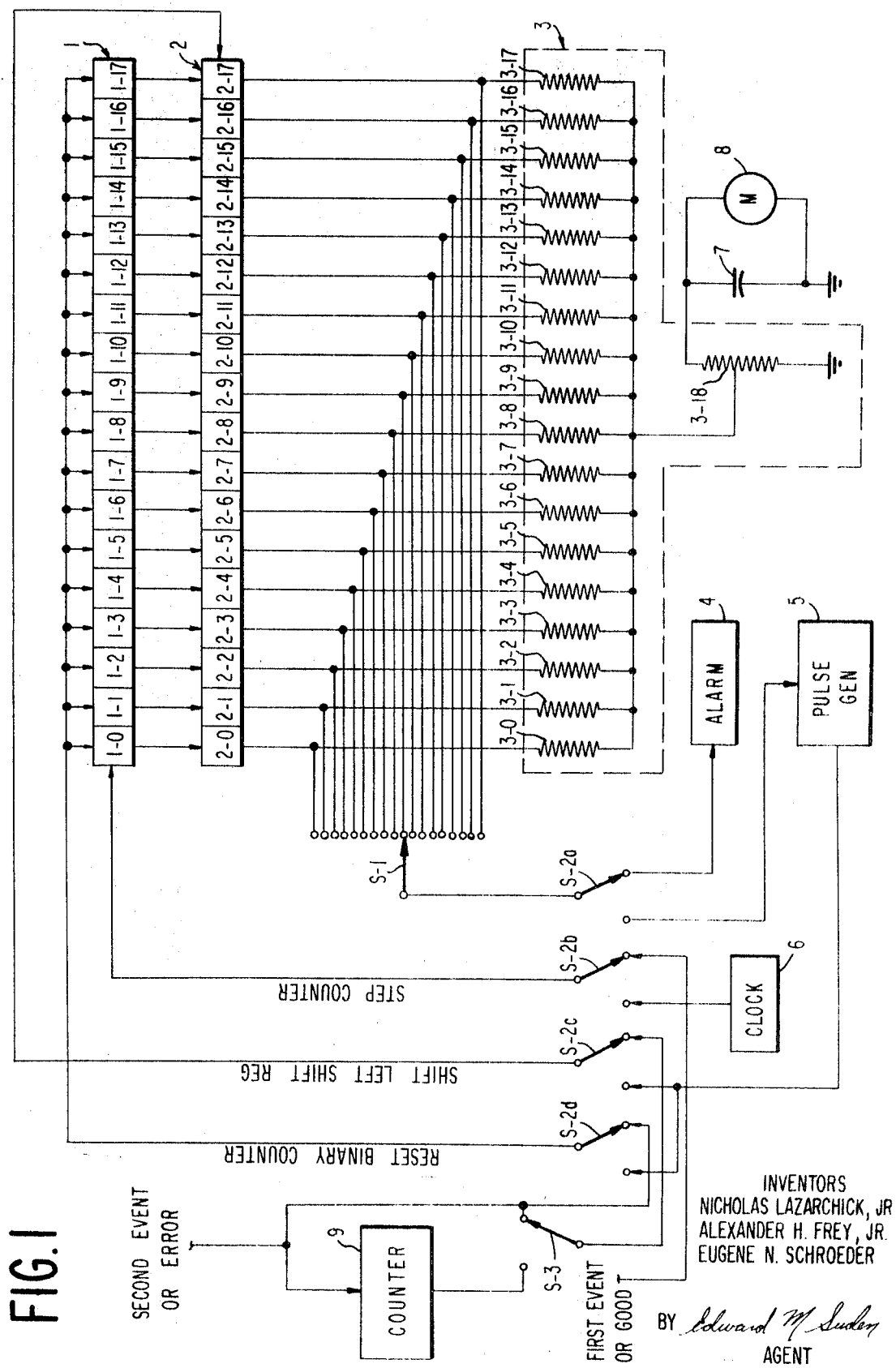

FIG. 1 shows a rate detector which embodies the invention which is capable of indicating ratios of second events to first events in the range of 1/1 to 1/131,072. It should be here noted that the rate detector herein described is for the purpose of example, and that it is well within the state of the art to extend the teaching herein disclosed to obtain a rate detector having a different range than described.

The rate detector is primarily comprised of a binary counter 1 having 18stages 1—0 to 1—17. Binary counters of this type are well known in the art and an example of one such binary counter may be found in R. K. Richards book, "Digital Computer Components and Circuits", pg. 177. The output from each of the stages 1—1 through 1—17 of the binary counter 1 is inputted to a respective stage 2—0 to 2—17 of a shift register 2. Shift register 2 has the characteristic that each of the stages 2—0 through 2—17 may be set independently of each other and the shift register as a whole is shifted left one stage of each shift pulse. Shift registers of this type are well known in the art and a discussion of this type of shift register can be found in I. Flores book "Computer Logic-The Functional Design of Digital Computers", pgs. 162 through 171.

The output of each stage 2—0 through 2—17 of shift register 2 is connected to a respective resistor 3—0 through 3—17 of a resistor summing network 3. The resistor summing network 3 may either have all resistors 3—0 to 3—17 of the same value or each resistor 3—0 to 3—17 may take on some weighted value by varying the resistance of resistors 3—0 to 3—17. The current passing through the resistor summing network 3 is sampled from resistor 3—18 by means of meter 8. Capacitor 7 in parallel with meter 8 is used to dampen the response to meter 8.

Switch S1 connects the output of one of the stages 2—0 through 2—17 of shift register 2 via switch S2 position S2a, ON position, to the alarm circuitry 4. The alarm circuitry 4 will sense when the selected stage of the shift register 2 goes from an on to an off state. The alarm of alarm circuit 4 may take any form that is desirable, such as the lighting of a light, a ringing of a bell, or the sending of a command to initiate a further operation to other control circuitry.

Switch S2 is a four-pole, double-throw switch which places the rate detector either in the "On Line" mode or in the "Calibrated" mode. In the "On Line" mode of switch S2, the output of switch S1 is connected to the alarm circuit 4 via switch position S2a of switch 2, first events are allowed to step the binary counter 1 via switch position S2b, the second events output of switch S3 is allowed to shift left shift register 2 via switch position S2c and every second event is allowed to reset the binary counter 1 via switch position S2d.

In a "Calibrate" mode of switch S1, the output of switch S1 is connected to pulse generator 5 via switch position S2a, clock 6 steps the binary counter 1 via switch position S2b and the output of pulse generator 5 resets the binary counter 1, and shifts left the shift register 2 via switch position S2d and S2c respectively.

Pulse generator 5 generates a pulse each time the stage 2—0 through 2—17 of shift register 2 that is being monitored via switch S1 goes from an off state to an on state. Clock 6 is an oscillator which is used to step the binary counter 1 in the "Calibrate" mode of operation of the rate detector.

When in the "On Line" mode, switch S3 allows either each second event or one out of n second event to shift left the shift register 2. When switch S3 is connected to counter 9, the shifting of the shift register 2 can be made for every 2, 4, 8, etc. second events whichever is desired by the operator.

OPERATION OF THE PREFERRED EMBODIMENT

The operation of the preferred embodiment of the invention will be discussed with the invention used in an error rate detection environment. In this environment the rate detector displays the number of good bits between errors rather than counting errors per unit time or per fixed number of incoming bits. It, therefore, must be realized that there is no fixed sampling time within this rate detector, for the occurrence of an error is random and unpredictable.

Each input bit deemed good causes the 18 stage binary counter 1 to add 1 count. As stage 1—0 through 1—17 is turned on, a corresponding stage 2—0 through 2—17 in the shift register 2 is set to the on state. The effect of this is to hold the information that a given stage 1—0 through 1—17 of the binary count 1 has been turned on. Assume that the binary counter and the shift register are both cleared, then the first good bit will turn on binary counter stage 1—0 which in turn will turn on shift register stage 2—0, the next good bit will turn off binary counter stage 1—0 and turn on binary counter stage 1—1 which in turn will turn on shift register stage 2—1 with shift register stage 2—0 remaining on.

TABLE I

| No. of Good Bits | Binary Counter Stages | | | | Shift Register Stages | | | |
|---|---|---|---|---|---|---|---|---|
| | 1— | 1-1 | 1-2 | 1-3 | 2-0 | 2-1 | 2-2 | 2-3 |
| Start | 0 | 0 | 0 | 0 | 0 | 0 | | 0 |
| 1 | 1 | 0 | 0 | 0 | 1 | 0 | 0 | 0 |
| 2 | 0 | 1 | 0 | 0 | 1 | 1 | 0 | 0 |
| 3 | 1 | 1 | 0 | 0 | 1 | 1 | 0 | 0 |
| 4 | 0 | 0 | 1 | 0 | 1 | 1 | 1 | 0 |
| 5 | 1 | 0 | 1 | 0 | 1 | 1 | 1 | 0 |
| 6 | 0 | 1 | 1 | 0 | 1 | 1 | 1 | 0 |
| 7 | 1 | 1 | 1 | 0 | 1 | 1 | 1 | 0 |
| 8 | 0 | 0 | 0 | 1 | 1 | 1 | 1 | 1 |
| 9 | 1 | 0 | 0 | 1 | 1 | 1 | 1 | 1 |
| 10 | 0 | 1 | 0 | 1 | 1 | 1 | 1 | 1 |

Table 1 shows the method of counting good bits by the binary counter 1 and the shift register 2. As can now be realized, shift register stage 2—2 will be turned on with the occurrence of the fourth good bit, shift register stage 2—3 will be turned on with the occurrence of the eighth good bit, shift register stage 2—4 will be turned on with the occurrence of the 16th good bit and so on until shift register stage 2—17 is turned on with the occurrence of the 131,072 good bit.

The number of stages of the shift register 2 that is initially turned on is therefore equal to one plus the quantized log to the base 2 of the number of good bits that exist in the binary counter. The log is quantized since the log is constrained to a whole number. For example, stages 2—0 through 2—6 of the shift register 2 will be turned on as the binary counter 1 counts between 64 and 127, the stages 2—0 through 2—7 will be turned on as the binary counter counts between 128 and 256.

The number of stages of the shift register 2 that are turned on is converted to an analog current by a resistor summing network 3. Meter 8 monitors the analog current flowing through resistor 3—18 of the resistor summing networks 3, such that as the number of good bits goes from 0 to 131,072, meter 8 will go from zero to a full scale reading in 18 steps, each step being the quantized log to the base 2 of the binary count existing in the binary counter 1.

When counter 9 is not connected, each error bit causes the binary counter 1 to be reset to 0 and the contents of the shift register 2 to be shifted one position toward the low order. The shifting of one position toward the low order of the shift register effectively divides the contents of the shift register by 2. For a constant error rate, therefore, there is a variation of one step in the indication which, for high data rates, is damped by the meter 8 in conjunction with capacitor 7.

For increase in the number of good bits between errors, the meter 8 will remain and indicate the shifted value of the shift register 2 until the number of good bits counted by the binary counter 1 is greater than one-half the number of good bits counted in the previous interval, then the meter will increase in reading as the shift register 2 follows in a logarithmic manner the increasing binary count in binary counter 1.

For a decrease in the number of good bits between errors, the restoring of the highest order bit in the shift register 2 that had existed in the previous interval will not occur before the occurrence of the next error, therefore, the shift register will again shift to the left one position. Thus, the shift register 2 will always shift one position to the low order when the quantized log 2 of the number of goods bits between errors which just has been measured is less than the quantized log 2 of the number of good bits that had been measured in the previous interval. This process will be repeated until the one step variation indication appears which is indicative that a constant error rate has been reestablished.

The rate detector is more sensitive to an increasing error rate than it is to a decreasing error rate. This is true since it takes twice the number of good bits to have the meter indicate a rise whereas it takes only one good bit less the value of the previously measured quantized log to have the meter decrease in reading. The meter 8 actually indicates the average of the quantized log to the base 2 of the number of good pulses that have occurred in at least the last two measured intervals.

Alarm circuit 4 monitors the contents of shift register 2 by means of switch S1 when the rate detector is in the "On Line" mode. Alarm circuitry 4 is activated when the stage of the shift register 2 is being monitored goes from an on to an off condition. It should be realized that at a constant error rate the contents of the shift register will vary between two adjacent stages. Therefore, it is desired to obtain an alarm when the error rate should become excessive it is necessary to properly select which of the stages of the shift register 2 should be monitored by the alarm circuitry 4. For example, if it is desirable to maintain $2^{15}$ good bits between errors and to sense when that error rate becomes greater than this value, it would be necessary to monitor the stage 2—13 of shift register 2 which is associated with the binary value $2^{13}$. This is the case since for an error rate of $2^{15}$ good bits the shift register 2 will vary between stages 2—14 and 2—15. It, therefore, takes at lest the occurrence of two measuring intervals less than the threshold of $2^{15}$ good bits to determine if the required threshold has been surpassed and therefore an alarm should be generated.

The error rate can be desensitized to the occurrence of errors by placing switch S3 into the position such that the output of counter 9 controls the shifting of shift register 2. Counter 9 is a binary counter which will produce an output pulse on the occurrence of a dictated number of errors bits as prescribed by the number of stages within the binary counter 9.

The rate detector may be calibrated by placing switch S2 in the "Calibrate" position. When this is done clock 6 provides pulses to step the binary counter 1. The output of shift register 2 is monitored by pulse generator 5 which will generate an output pulse whenever the stage of the shift register 2 that is being monitored goes from an off to an on condition. The output of the pulse generator 5 will reset the counter 1 and shift the contents of shift register 2 one position toward the low order. Thus, the binary count 1 will cycle to a fixed count and the shift register 2 will vary between the stage that is being monitored and the next lower order stage of the shift register 2, providing to the meter 8 the indication of a constant error rate of that value being monitored. For example, let switch S1 monitor shift register stage 2—10 which will be set on a count of 1,024. When stage 2—10 of the shift register 2 is set a pseudo error is generated by pulse generator 5 which will reset the binary counter 1 and shift the shift register 2 one position to the low order, therefore, turning off shift register stage 2—10. The binary counter will then count the next 1,024 output pulses from the clock 6, at which time shift register stage 2 10 will again be set causing another pseudo error to appear. The output on meter 8 will, therefore, have a reading of $2^9$ good bits since shift register stage 2—10 is only on for one bit time as dictated by the frequency of the clock 6 and since the meter 8 has a damped response due to capacitor 7. It can be realized, therefore, that by changing the position of switch S1 the error rate for each of the stages in the shift register 2 may be indicated on meter 8 and, therefore, meter 8 may be calibrated.

The rate detector of the instant invention has the advantages of being capable of displaying a wide range of error rates. Error rates in the ratio of 1 error bit/1 good bit to error rates of 1 error bit/131,072 good bits may be displayed. Further, an alarm threshold may be set for error rates in the order of 1 error bit/4 good bits to error rates of 1 error bit/131,072 good bits.

It should be further noted that this rate detector is extremely sensitive to degradation of a channel being monitored. Further, the error rate detector will set the alarm for fewer errors on a channel which is marginal, that is which is operating just above the threshold value, then where a channel is operating several orders of magnitude greater than the threshold value. Where a channel is operating at the minumum allowable error rate it takes two consecutive intervals of less than the threshold value to generate an alarm. Whereas where a channel is operating several orders above the threshold value it would take $n$ consecutive intervals where the number of good bits within each interval is less than the quantized $\log_2$ of the previous interval, where $n$ is defined by 2+1 for each order of magnitude greater than the threshold value. For example, if the threshold value was one error in $2^{10}$ good bits and channel was marginal, it would take two consecutive measuring intervals of a count less than $2^{10}$ good bits to set off the alarm. Where, however, the channel is operating at $2^{15}$ good bits it would take seven consecutive intervals, wherein each interval has the quantized $\log_2$ of the number of good bits less than the quantized $\log_2$ of the number of good bits in the preceding interval, to cause the alarm to be turned on. Therefore, the rate detector has the distinct advantage of being more tolerant of errors in channels that are above a desired quality level than with channels that are marginal with respect to the desired quality level.

It should be further noted that when the channel error becomes catastrophic, shift register 2 will be quickly shifted into an alarm state and further shifted until the sift register is entirely clear yielding a reading of 0 on meter 8.

While it has been shown in the preferred embodiment that the input to rate detector is a good bit or an error bit for each incoming bit, it should be realized that the incoming data stream could be sampled at any interval that is desired whereupon the sampled bits would be rated as good bits or error bits.

While the invention has been particularly shown and described with reference to a preferred embodiment thereof it would be understood by those skilled in the art that various changes in form and detail may be made therein without departing from the spirit and scope of the invention.

What I claim is:

1. A rate detector, which measures the average of the quantized $\log_2$ of the number of first events per measuring period for at least two measuring periods, where the measuring period is the duration between two adjacent second events, comprising:
    a binary counter for digitally counting the first events in each measuring period;
    a shift register connected to said binary counter for selectively generating the quantized $\log_2$ of the output of said binary counter per measuring period and for generating digitally an average output for the quantized $\log_2$ of at least the last two measuring periods by shifting the contents of said shift register one position toward the lower order with the occurrence of each of said second events;
    a resistive network connected to said shift register converting said averaged output to an analog signal; and
    a meter and resistive-capacitive network connected to said resistive network for displaying said averaged output.

2. A rater detector which measures the average of the quantized $\log_2$ of the number of first events per measuring period for at lest two measuring periods, where the measuring period is the duration between two adjacent second events, comprising:
    first means for digitally counting the first events in each measuring period;
    second means connected to said first means for selectively generating digitally the quantized $\log_2$ of the output of said first means per measuring period and for generating digitally an average output for the quantized $\log_2$ of at least the last two measuring periods;
    third means connected to said second means for monitoring and displaying said averaged output from said second means;
    fourth means for establishing a reference event rate; and
    a fifth means for monitoring said average output from said second means and said reference event rate of said fourth means to produce an alarm when said reference event rate is surpassed.

3. A rate detector as set forth in claim 2 further comprising:
    a sixth means connected to said first, second, third and fourth means for calibrating said rate detector.

4. A rate detector as set forth in claims 2 or 3 wherein:
    said first means comprises a binary counter; and
    said second means comprises a shift register, said shift register and said output from said binary counter determining the number of measuring periods to be averaged by said second means.

5. A method for measuring an event rate of a second event with respect to a first event where the events are occurrences of bits in a bit stream comprising the steps of:
    digitally counting in binary form the number of first events in each measuring period, where said measuring period is the duration between two adjacent second events;
    selectively generating the digital quantized $\log_2$ of the number of first events in said measuring periods by generating a bit for each digit of the binary count;
    averaging for at least two measuring periods the quantized $\log_2$ of the number of first events in said measuring period by subtracting one bit from the total with the occurrence of each said second event to obtain an average event rate;
    monitoring said average event rate;
    displaying said average event rate;
    generating said average event rate to said threshold event rate; and
    generating an alarm when said threshold event rate is surpassed by said average event rate.

PO-1050
(5/69)

UNITED STATES PATENT OFFICE
CERTIFICATE OF CORRECTION

Patent No. 3,596,065          Dated July 27, 1971

Inventor(s) Nicholas Lazarchick, Jr. et al.

It is certified that error appears in the above-identified patent and that said Letters Patent are hereby corrected as shown below:

Column 3, Table 1, line 52, after "1-" please insert --0--.
      "   ,   "   , line 55, on the start line the 7th 0 is omitted, please insert a 0, therefore.

Column 6, line 24, Claim 2, "rater" should be --rate--.

Signed and sealed this 27th day of June 1972.

(SEAL)
Attest:

EDWARD M.FLETCHER,JR.        ROBERT GOTTSCHALK
Attesting Officer               Commissioner of Patents